(12) United States Patent
Lehmann

(10) Patent No.: US 7,509,918 B2
(45) Date of Patent: Mar. 31, 2009

(54) RUDDER POST FOR RUDDERS FOR WATER VEHICLES

(75) Inventor: Dirk Lehmann, Winsen (DE)

(73) Assignee: becker marine systems GmbH & Co. KG, Hamburg (DE)

( * ) Notice: Subject to any disclaimer, the term of this patent is extended or adjusted under 35 U.S.C. 154(b) by 0 days.

(21) Appl. No.: 12/069,285

(22) Filed: Feb. 8, 2008

(65) Prior Publication Data

US 2008/0134951 A1 Jun. 12, 2008

Related U.S. Application Data

(62) Division of application No. 11/237,624, filed on Sep. 27, 2005, now abandoned.

(30) Foreign Application Priority Data

Jun. 30, 2005 (DE) ............... 20 2005 010 469 U
Aug. 26, 2005 (DE) ............... 20 2005 013 583 U

(51) Int. Cl.
*B63H 25/06* (2006.01)

(52) U.S. Cl. ................... 114/169; 114/162
(58) Field of Classification Search .......... 114/162–169
See application file for complete search history.

(56) References Cited

U.S. PATENT DOCUMENTS

| 4,024,827 | A | * | 5/1977 | Becker ................. 114/162 |
| 4,284,025 | A | | 8/1981 | Eckhard |
| 6,072,252 | A | * | 6/2000 | Van Dine et al. ........ 310/43 |
| 6,350,204 | B1 | | 2/2002 | Yasui et al. |
| 6,464,591 | B1 | | 10/2002 | Nakajima |
| 2002/0195291 | A1 | * | 12/2002 | Nonogaki ............ 180/337 |

FOREIGN PATENT DOCUMENTS

| EP | 0 579 533 | 1/1994 |
| JP | 52 071 096 | 6/1977 |
| JP | 11 032 455 | 2/1999 |
| JP | 2001032819 | 2/2001 |
| TW | 226 353 | 1/2005 |

* cited by examiner

*Primary Examiner*—Ed Swinehart
(74) *Attorney, Agent, or Firm*—Friedrich Kueffner

(57) ABSTRACT

The rudder post (40) for rudders for water vehicles has end sections (41, 42) made of a metallic material, in particular of wrought iron, and a mid post section (45) made of a nonmetallic material connected with the end sections so that the rudder post has a relatively low weight even for a very big length by maintaining a high flexural strength and torsion stiffness.

8 Claims, 3 Drawing Sheets

RUDDER POST FOR RUDDERS FOR WATER VEHICLES

This application is a Divisional Application of U.S. patent application Ser. No. 11/237,624 filed Sep. 27, 2005 now abandoned.

This invention relates to a rudder post for rudders for water vehicles.

Rudder posts for rudders of water vehicles are mainly made of wrought iron. If rudder posts with a big length are to be forged, there are difficulties as far as only a very small number of forges with a corresponding capacity are available and the orders of rudder posts, in particular with a length over 10 m, mostly verge on the capacity of these forges. Add to this that such rudder posts which are long and often have also a big diameter have a high weight which often exceeds the 100 t limit. This requires again particular constructions of the positioning and suspension of the rudder blade on the rudder post.

Thus, the aim of this invention is to create a rudder post which has a low weight by being big and which is partly made of a metallic material, in particular of wrought iron, so that a high flexural strength and torsion stiffness nevertheless remains maintained.

This aim is achieved with a rudder post according to the above described type with the characteristics indicated in claim 1.

Accordingly, the invention consists in that the rudder post has end sections made of a metallic material, in particular of wrought iron, and a mid section made of a nonmetallic material connected with the end sections.

According to a preferred embodiment of the invention, the mid section of the rudder post made of a nonmetallic material is made of a carbon fiber composite material or of carbon fibers, preferably of graphite fibers.

Moreover, the invention provides that both end sections of the rudder post made of wrought iron are provided at their front sides turned to each other with neck-type reduced journal-shaped sections, the peripheral surfaces of which are provided with structures as adhesive surfaces for the mid section made of carbon fibers which surround the journal-shaped sections in form of windings, whereby the carbon fibers are coated and filled with a cast resin in the whole winding area which extends over the length of the mid section.

Further advantageous configurations of the invention are the subject of the subclaims.

The configuration of the rudder post according to the invention brings the advantage that rudder posts with a big length, a big diameter and a high weight can be manufactured for rudders of water vehicles without a fabrication of the whole rudder post of wrought iron being necessary because only the end sections of the rudder post are made of wrought iron while the mid section of the rudder post which is situated between the end sections is made of a nonmetallic material, in particular of a carbon fiber composite material or of carbon fibers, preferably of graphite fibers, which form the mid post section of the rudder post in form of windings, whereby the windings of the carbon fiber composite material or of the carbon fibers extend into the opposite ends of the end sections of the rudder post and are fixedly connected with these end sections. In this way, a rudder post is created, the end sections of which are made of wrought iron and can thus be exposed to the highest loads. Moreover, the end sections of the rudder post made of wrought iron receive the bearings for the positioning of the rudder post in port bearing for the rudder post.

The subject of this invention is represented as an example in the drawings.

Figure 1:
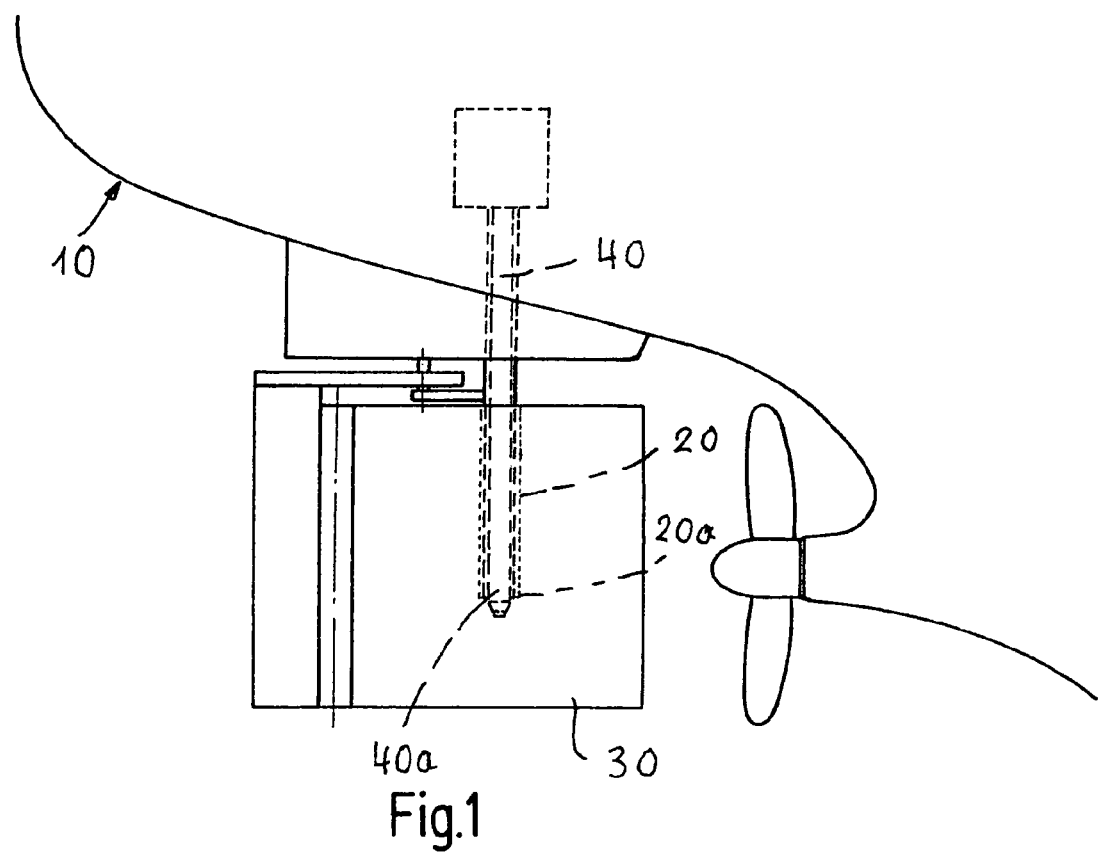
FIG. 1 shows a rudder arrangement provided in the afterbody area with a rudder post placed in a rudder port bearing.
Figure 2:
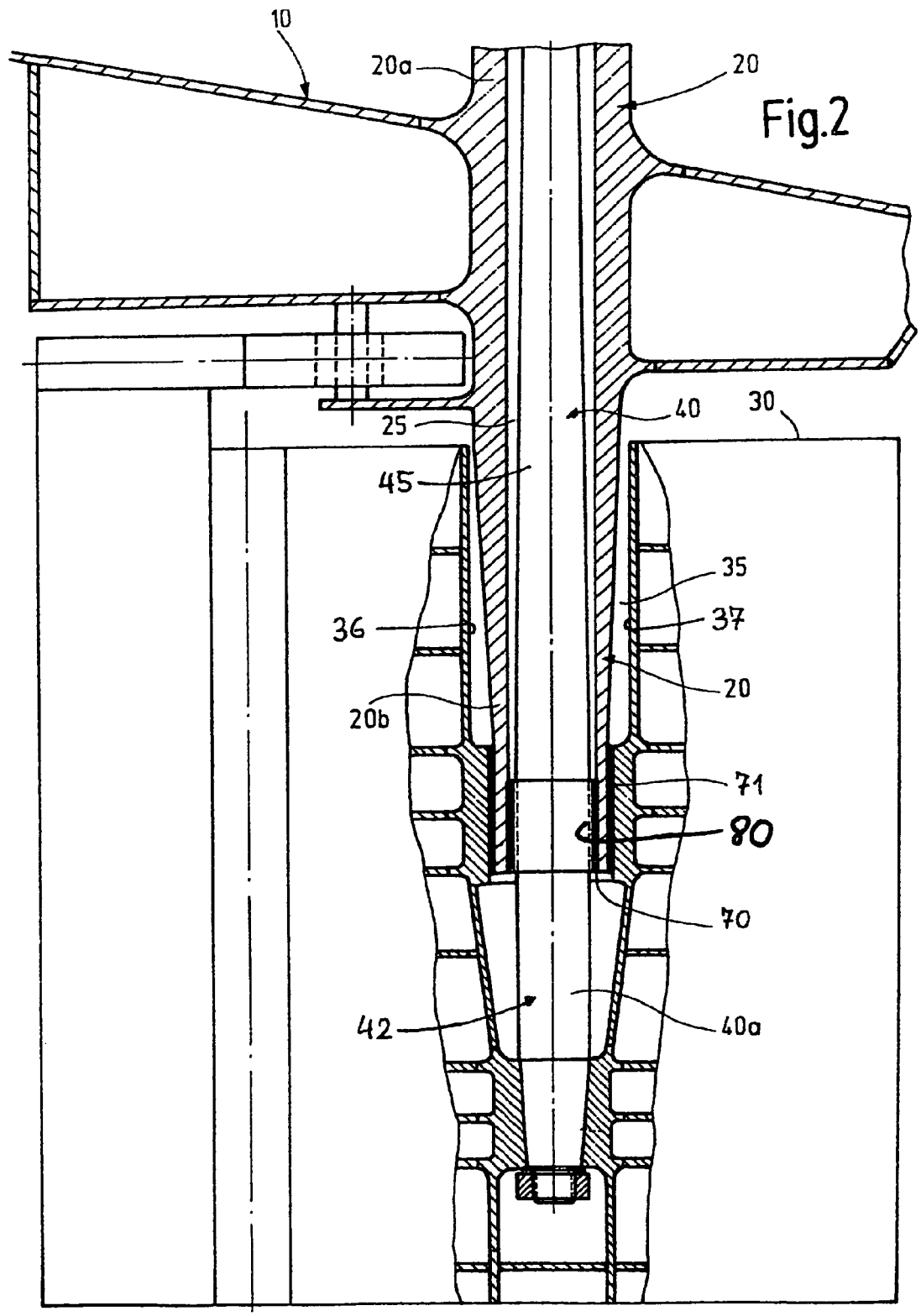
FIG. 2 shows an enlarged representation of the rudder arrangement, partly in a side view, partly in a vertical cut.

For the embodiments shown in FIGS. 1 and 2, 10 designates a hull, 20 a rudder port bearing with its ends 20a, 20b, 30 a rudder blade and 40 a rudder post.

The rudder port bearing 20 configured as cantilever beam is fixedly connected with its upper end 20a with the hull 10 and has an inner bore 25 which receives the rudder post 40. The rudder port bearing 20 penetrates into the rudder blade 30 which is fixedly connected with the free lower end 20b of the rudder post 40 guided through the inner bore 25 of the rudder port bearing 20. The preferably cylindrical taper 35 formed in the rudder blade 30 for receiving the free end 20b of the rudder port bearing 20 is limited by a lateral planking 36, 37 (FIG. 2).

For the positioning of the rudder post 40, the rudder port bearing 20 has at least one bearing. For the embodiment shown in FIG. 2, two bearings 70, 71 are provided, namely an inner bearing 70 and an outer bearing 71, whereby the bearing 70 is configured on the inner wall face of the rudder port bearing 20 and the other bearing 71 on the outer wall face of the rudder port bearing or on the inner wall face of the bearing provided on the rudder blade 30.

Figure 3:
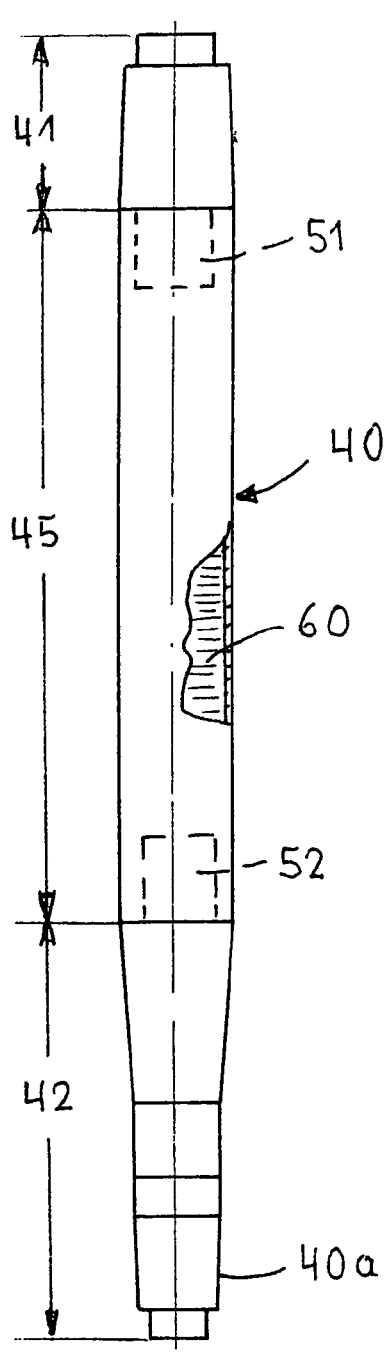
FIG. 3 shows a view of a rudder post with end-sided sections of wrought iron and with a mid post section made of a nonmetallic material.

The rudder post 40 positioned in the rudder port bearing 20 is configured in such a manner that its both end sections 41, 42 are made of wrought iron, whereas the mid post section 45 is made of a nonmetallic material, in particular of a carbon fiber composite material or of carbon fibers, preferably of graphite fibers (FIG. 3). By wrought iron, an iron with a carbon content below 0,6% is understood.

Figure 4:
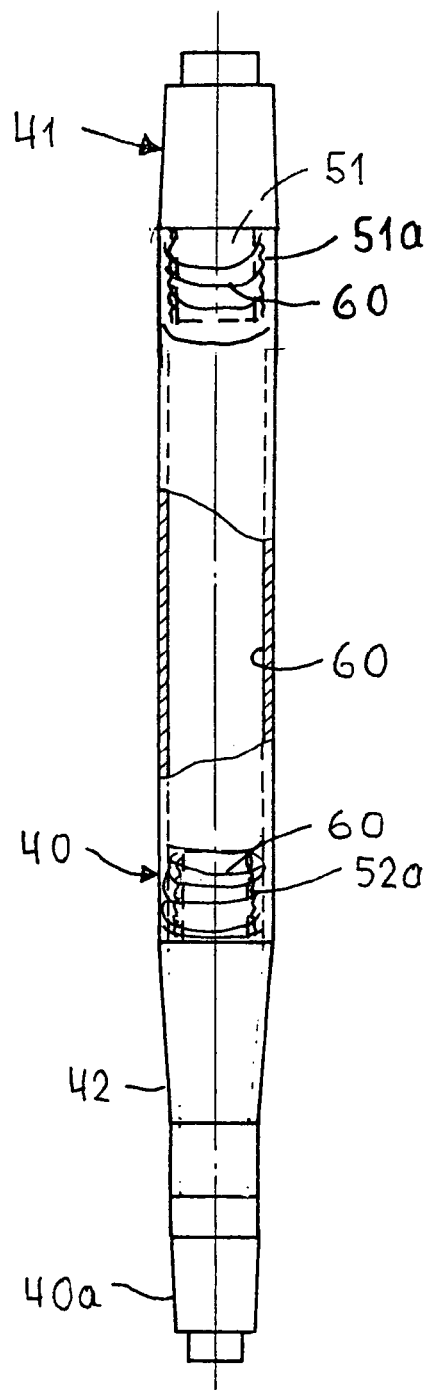
FIG. 4 shows a view of a rudder post with end sections made of wrought iron and a mid section of wounded carbon fibers which is connected with the end sections.

Different constructive configurations can be provided for the fixing of the mid post section 45 of the rudder post 40. As the embodiment according to FIG. 4 shows, the front sides opposed to each other of both end sections 41, 42 have journal-shaped sections 51, 52 which are preferably provided with an outer wall structure 51a, 52a in order to guarantee the grip and the support of the mid post section 45 made of carbon fibers. Preferably the carbon fibers or the carbon fiber composite material are fixed on the journals 51, 52 of the end sections 41, 42 by windings 60, whereby the windings extend over the periphery of both journals 51, 52 and over the whole length of the mid post section 45. For increasing the strength, the carbon fibers are covered or coated with a cast resin.

The configuration of the rudder post according to the invention is particularly advantageous in so far as very big lengths of rudder posts can be produced with a lowest weight. For a rudder post having for example a length of 10 m, the weight will be reduced by more than 50% compared to a rudder post which is completely made of wrought iron.

In one embodiment of the rudder arrangement the ratio of the length of the end section (41, 42) and of the mid post section (45) of the rudder post (40) is ⅙ to ⅔.

A further embodiment provides that the rudder post 40 placed in the rudder port bearing 20 has material reinforcements 80 in the area of the bearings 70, 71 placed in the rudder port bearing 20, whereby preferably the material reinforcements 80 are provided in the area of the rudder port bearing end 20b. These material reinforcements 80 are configured on the rudder post 40 preferably on the end section 42 of the rudder post 40 in the area of the inner bearing 70 provided on the rudder port bearing 20 (FIG. 2).

LIST OF REFERENCE NUMERALS

10 Hull
20 Rudder port bearing
20a Upper rudder port bearing end
20b Lower rudder port bearing end
25 Inner bore
30 Rudder blade
35 Cylindrical recess
36 Lateral planking
37 Lateral planking
40 Rudder post
40a Lower rudder post end
41 End section
42 End section
45 Mid post section
51 Journal
52 Journal
51a Surface structure
52a Surface structure
60 Carbon fiber windings
70 Inner bearing
71 Outer bearing
80 Material reinforcement

The invention claimed is:

1. A rudder arrangement for water vehicles comprising a rudder blade (30), a rudder port bearing (20), and a rudder post (40), wherein the rudder post (40) has end sections (41, 42) of wrought iron, and a mid post section (45) of a nonmetallic material connected with the end sections (41, 42), wherein at least one of the end sections (41, 42) receives a bearing (70, 71) for positioning the rudder post (40) in the rudder post bearing (20), wherein the end sections (41, 42) of the rudder post (40) of wrought iron have at their front sides facing to each other with neck-type reduced journal-shaped sections (51, 52), and wherein the mid post section (45) is made of a fiber composite material, wherein the fibers of the fiber composite material are wound around the journal-shaped sections (51, 52).

2. The rudder arrangement according to claim 1, wherein the mid post section (45) of the rudder post (40) of a nonmetallic material is made of a fiber composite material or of carbon fibers.

3. The rudder arrangement according to claim 2, wherein the fibers are graphite fibers.

4. The rudder arrangement according to claim 2, wherein the neck-type reduced journal-shaped sections (51, 52) have peripheral surfaces which have structures (51a, 52a) as adhesive surfaces for the mid post section (45) made of carbon fibers which surround the journal-shaped sections (51, 52) as windings (60) on the end sections (41, 42), wherein the carbon fibers are coated and filled with a cast resin in a whole winding area which extends over the length of the mid section (45).

5. The rudder arrangement according to claim 1, wherein the ratio of the length of the end section (41, 42) and of the mid post section (45) of the rudder post (40) is $\frac{1}{6}$ to $\frac{2}{3}$.

6. The rudder arrangement according to claim 1, wherein the mid post section is mounted in a rudder port bearing (20) and, wherein the rudder post (40) has material reinforcements in the area of the bearings (70, 71).

7. The rudder arrangement according to claim 6, wherein the material reinforcements (80) are provided in an area of a rudder port bearing end (20b).

8. The rudder arrangement according to claim 6, wherein the material reinforcements (80) are configured as an area of an inner bearing (70) provided on the rudder port bearing (20).

* * * * *